United States Patent [19]

Patton et al.

[11] Patent Number: 5,093,466

[45] Date of Patent: Mar. 3, 1992

[54] POLYOXAMIDE OXYGEN BARRIER

[75] Inventors: Tad L. Patton, Baytown; James M. Farley, League City, both of Tex.

[73] Assignee: Exxon Chemical Patents Inc., Linden, N.J.

[21] Appl. No.: 481,842

[22] Filed: Feb. 20, 1990

[51] Int. Cl.$^5$ .............................. C08G 69/26
[52] U.S. Cl. .................. 528/343; 428/474.4; 528/338; 528/339; 528/340
[58] Field of Search ............... 528/343, 338, 339, 340; 428/474.4

[56] References Cited

U.S. PATENT DOCUMENTS

| | | | |
|---|---|---|---|
| 2,558,031 | 6/1951 | Allen et al. | 528/343 |
| 3,247,168 | 4/1966 | Stamatoff et al. | 528/343 |
| 3,514,367 | 5/1970 | James | 161/165 |
| 3,570,748 | 3/1971 | Coyle et al. | 229/53 |
| 3,733,214 | 5/1973 | Stockhausen | 117/76 F |
| 3,790,531 | 2/1974 | Christoph et al. | 528/343 |
| 3,890,448 | 6/1975 | Ito | 426/126 |
| 3,935,172 | 1/1976 | Vogl et al. | 260/78 R |
| 4,058,647 | 11/1977 | Inoue et al. | 428/474 |
| 4,085,163 | 4/1978 | Gergen et al. | 260/857 D |
| 4,085,244 | 4/1978 | Stillman | 428/192 |
| 4,104,438 | 8/1978 | Angelo et al. | 428/332 |
| 4,105,818 | 8/1978 | Scholle | 428/192 |
| 4,111,896 | 9/1978 | Gergen et al. | 260/42.18 |
| 4,119,615 | 10/1978 | Schulze | 528/343 |
| 4,126,600 | 11/1978 | Gergen et al. | 260/42.18 |
| 4,182,457 | 1/1980 | Yamada et al. | 215/1 C |
| 4,296,156 | 10/1981 | Lustig et al. | 428/35 |
| 4,309,466 | 1/1982 | Stillman | 428/35 |
| 4,405,667 | 9/1983 | Christensen et al. | 428/35 |
| 4,410,482 | 10/1983 | Subramanian | 264/515 |
| 4,416,942 | 11/1983 | DiLuccio | 428/332 |
| 4,444,817 | 4/1984 | Subramanian | 428/36 |
| 4,559,266 | 12/1985 | Misasa et al. | 428/341 |
| 4,579,773 | 4/1986 | Cole et al. | 428/260 |
| 4,596,866 | 6/1986 | Jackson, Jr. et al. | 528/347 |
| 4,612,221 | 9/1986 | Biel et al. | 428/35 |
| 4,842,946 | 6/1989 | Foust et al. | 428/458 |

FOREIGN PATENT DOCUMENTS 0626510 8/1961 Canada .............................. 528/343

OTHER PUBLICATIONS

Turbidy et al., M. Baker, ed., The Wiley Encyclopedia of Packaging Technology, pp. 477-482 (John Wiley & Sons, NY, 1986).

Morgan, Condensation Polymers: by Interfacial and Solution Methods, pp. 163-260 (Interscience Publishers, 1985).

Chang et al., Regular Copolyamides. II. Preparation and Characterization of Regular Aliphatic Copolyoxamides, pp. 1043-1060 (John Wiley & Sons, 1977).

Stevenson et al., Regular Copolyamides. III. Preparation and Characterization of Regular Aliphatic/Aromatic Copolyoxamides, pp. 779-809 (Marcel Dekker, Inc. 1977).

Krizan et al. The Effect of Structure upon the Oxygen Permeation Properties of Amorphous Polyamides, pp. 9-10 (Polymer Preprints (ACS), Spring 1989).

Primary Examiner—Harold D. Anderson
Attorney, Agent, or Firm—M. B. Kurtzman

[57] ABSTRACT

Oxygen barrier structures such as packages, laminated films, etc. are disclosed. The oxygen barrier has at least one layer comprising a polymer having oxamide units of the formula:

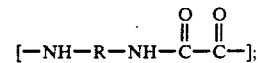

and may further include amide units selected from the formulae:

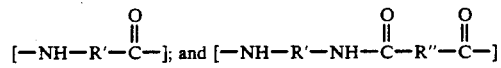

wherein R and R' are independently hydrocarbyl radicals of from 2 to 20 carbon atoms, and R" is a hydrocarbyl radical of from 1 to 18 carbon atoms. The polyoxamide or copoly(amide-oxamide) layer has an oxygen permeability which, at a high relative humidity, is less than or about the same as the oxygen permeability at a low relative humidity. Also disclosed is a method of protecting an article such as a foodstuff against oxidation by packaging the article with the oxygen barrrier structure.

16 Claims, No Drawings

POLYOXAMIDE OXYGEN BARRIER

FIELD OF THE INVENTION

This invention relates to barrier resins, and more particularly to barrier resins comprised of polyoxamides and copoly(amide-oxamides). They have the unique property of having lower oxygen permeabilities at high relative humidities than at 0% relative humidity.

BACKGROUND ART

Some polyamides are used in the packaging industry because of their clarity, thermoformability, high strength and toughness over a broad temperature range, chemical resistance and barrier properties against gases, oils, fats and aromas. They are generally used as the barrier component in rigid packaging applications and in multi-layer structures. Polyamides or nylons, as they are also called, are thermoplastics characterized by the presence of repeating amide groups. The various types of nylons differ according to the structure of the organic segments separating the amide groups.

Film-forming nylons are usually linear and conform to one of two general structures:

and

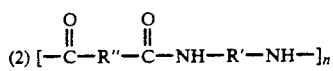

Polyamides of the first type are made from amino acids or their lactams; examples are nylon-6, nylon-11, and nylon-12, wherein the numbers correspond to the total number of carbon atoms in the repeat units. The second type of polyamides are made from diamines with dicarboxylic acids or their derivatives; examples are nylon-66 and nylon-610, wherein the first number corresponds to R' and refers to the number of methylene groups between the nitrogen atoms, and the second number corresponds to the number of carbon atoms in the COR"CO groups. Nylon copolymers can also be prepared from mixtures of diamines and dicarboxylic acids or their derivatives.

Various nylon processing methods and packaging applications are described in Tubridy et al., M. Baker, ed., *The Wiley Encyclopedia of Packaging Technology*. pp. 477–482 (Jon Wiley & Sons, N.Y. 1986).

Barrier resins, i.e. materials which impede the permeation of small molecules through the polymer structure, have revolutionized the packaging industry in recent years. The oxygen permeability of some barrier polymers increases appreciably with increasing relative humidity. Examples are polyvinyl alcohol, ethylene-vinyl alcohol copolymers, and nylons 6 and 66. Nylon-66, for example, has an oxygen permeability at 30° C. and 0% relative humidity of $2.4 \times 10^{-12}$ cc-cm/cm$^2$-sec-cm Hg, but at 80% relative humidity its oxygen permeability is $4.9 \times 10^{-12}$ cc-cm/cm$^2$-sec-cm Hg and continues to increase rapidly as the relative humidity approaches 100%. Poly[hexamethyleneisophthalamide/terephthalamide], an amorphous nylon barrier resin available under the trade designation SELAR ® PA is an exception; at 30° C., the oxygen permeability of SELAR ® PA films at 80% relative humidity is reported to be less than it is at 0% relative humidity. See Krizan et al., *Polymer Preprints (ACS)*. pp. 9–10 (Spring 1989).

The preparation of polyamides is well known, and is described, for example, in Morgan, *Condensation Polymers: By Interfacial and Solution Methods*. pp. 163–260 (Interscience Publishers, 1985). The preparation of regular aliphatic copolyoxamides is described by Chang et al., in *Journal of Polymer Science: Polymer Chemistry Edition*. vol. 15, pp. 1043–1060 (1977). The preparation of regular aliphatic/aromatic copolyoxamides is described in Stevenson et al., *Journal of Macromolecular Science-Chemistry*, A11(4), pp. 779–809 (1977).

From U.S. Pat. No. 3,935,172 to Vogl et al., it is known to prepare reverse osmosis membranes from regular amide/oxamide copolymers by casting a film of the polymer from a solution, partially evaporating the solvent, and fixing the polymer by gelation with a suitable non-solvent. These perm-selective membranes are stated to be useful in the desalination of water by reverse osmosis.

From U.S. Pat. Nos. 4,085,163; 4,111,896; and 4,126,600, all to Gergen et al., it is known to include a polyamide in a blend composition with an arene-diene block copolymer and a dissimilar engineering thermoplastic resin, such that at least two of the polymers form at least partial continuous network phases which interlock with the other polymer networks.

From U.S. Pat. No. 4,119,615 to Schulze, it is known to prepare a thermoplastic adhesive composition based on a polyoxamide prepared by reacting a polyoxypropylene polyamine with oxalic acid.

Other composite structures such as laminates which contain a polyamide or similar material are well known in are art. Representative of such art are U.S. Pat. No. 3,514,367 to James; U.S. Pat. No. 3,570,748 to Coyle et al.; U.S. Pat. No. 3,733,214 to Stockhausen; U.S. Pat. No. 3,890,448 to Ito; U.S. Pat. No. 4,058,647 to Inoue et al.; U.S. Pat. No. 4,085,244 to Stillman; U.S. Pat. No. 4,104,438 to Angelo et al.; U.S. Pat. No. 4,105,818 to Scholle; U.S. Pat. No. 4,182,457 to Yamada et al.; U.S. Pat. No. 4,296,156 to Lustig et al.; U.S. Pat. No. 4,309,466 to Stillman; U.S. Pat. No. 4,405,667 to Christensen et al.; U.S. Pat. No. 4,410,482 to Subramanian; U.S. Pat. No. 4,416,942 to DiLuccio; U.S. Pat. No. 4,444,817 to Subramanian; U.S. Pat. No. 4,559,266 to Misasa et al.; U.S. Pat. No. 4,579,773; to Cole et al.; U.S. Pat. No. 4,596,866 to Jackson, Jr. et al.; U.S. Pat. No. 4,612,221 to Biel et al.; and U.S. Pat. No. 4,842,946 to Foust et al.

SUMMARY OF THE INVENTION

We have discovered polyoxamides, including amide-/oxamide copolymers, have the surprising property of oxygen permeabilities which do not increase as the relative humidity of the ambient environment increases. These oxygen barrier polymers are useful in packaging and other oxygen barrier applications wherein the oxygen permeability of the barrier layer is retained at high relative humidities.

Briefly, the invention provides oxygen barriers which contain at least one layer comprising a polymer containing units of oxamide having the formula:

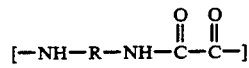

wherein R is a hydrocarbyl group of from 2 to about 20 carbon atoms, and wherein the polymer has an oxygen permeability at a high relative humidity about equal to or less than that at a low relative humidity. The polymer may be either a homopolyoxamide, or a copoly(amide-oxamide) which also contains amide units selected from at least one of the formulae:

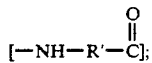

and

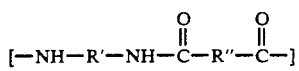

wherein R' is independently hydrocarbyl of from 2 to about 20 carbon atoms and R" is independently hydrocarbyl of from 1 to 18 carbon atoms. In the copoly(amide-oxamide), the molar ratio of oxamide:amide units ranges from about 1:100 to about 100:1.

The invention also provides a method for protecting an article against oxidation. The method includes the step of packaging the article in an airtight container wherein at least a portion of the container employs a film having at least one oxygen barrier layer comprising a polyoxamide or copoly(amide-oxamide) as described above.

In a further aspect, the invention provides an improvement in an air-tight package containing an oxygen barrier layer. The improvement is the employment of an oxygen barrier layer comprising a polyoxamide or copoly(amide-oxamide) as described above.

DETAILED DESCRIPTION OF THE INVENTION

The present invention employs polyoxamide or copoly(amide-oxamide) in oxygen barrier applications. In either case, the polymer contains oxamide units of the formula:

$$[-NH-R-NH-\overset{O}{\overset{\|}{C}}-\overset{O}{\overset{\|}{C}}-]$$

wherein R is a hydrocarbyl of from 2 to about 20 carbon atoms. In the copoly(amide-oxamide) embodiment, the polymer also contains units selected from the formulae:

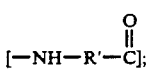

and

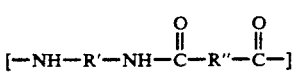

wherein R' is a radical selected from hydrocarbyl of from 2 to about 20 carbon atoms, and R" is a radical selected from hydrocarbyl of from 1 to about 18 carbon atoms. R and R' may be, for example, aliphatic and/or aromatic, i.e. alkylene, arylene, alkarylene, alkarylalkylene or the like. Generally, in the case wherein R or R' is aliphatic, the more carbon atoms in R or R', the higher the oxygen permeability in the resulting polyoxamide. On the other hand, the lower the number of carbon atoms in R, generally the higher the melting temperature. R and R' are preferably alkylene having from 6 to 12 carbon atoms, especially from 7 to 10 carbon atoms. R and R' may also be arylene of from 6 to 10 carbon atoms, such as, for example, phenylene or xylylene. R" is preferably arylene of from 6 to 10 carbon atoms or alkylene of from 3 to 10 carbon atoms.

The polyoxamides and copoly(amide-oxamides) employed herein generally have molecular weights sufficiently high to make them suitable for film forming; typical inherent viscosities range from about 0.4 to about 1.6 dl/g, preferably from about 0.6 to 1.3 dl/g. As used herein, inherent viscosities are determined at 30° C. using concentrated sulfuric acid containing 0.5 g of polymer per deciliter of solution. The polymers of this invention have number average molecular weights greater than 2000; for film applications, number average molecular weights greater than 5,000 are usually required.

The polyoxamides of the present invention may be prepared according to methods known in the art, and such methods are described, for example, in the Morgan, Chang et al. and Stevenson et al. references mentioned above. Briefly, the polyoxamides may be prepared using melt, interfacial, or solution techniques which typically involve the reaction of a diamine or mixture of diamines with oxalic acid, or one of its derivatives. Representative examples of suitable aliphatic diamines which may be reacted with oxalic acid or its derivatives include, for example, ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 2-methylpentamethylenediamine, 2-methylhexamethylenediamine, 2,2-dimethyl-1,5-diaminopentane, 2,2,4-trimethyl-1,6-diaminohexane, 2,4,4-trimethyl-1,6-diaminohexane, m-xylylenediamine, and the like. Suitable representative examples of aromatic diamines include p-phenylenediamine, 4,4'-diaminodiphenylsulfone, 4,4,-diaminodiphenylether, 4,4'-diaminodiphenylmethane, and the like. An example of an alicyclic diamine would be diaminodicyclohexylmethane. Such diamines may be used alone, or two or more thereof may be used as in a mixture to obtain polyoxamides in which the repeat units containing the different R groups of the diamines are distributed randomly in the polymer chains, or in sequential polymerization reactions to obtain block or regular alternating copolyoxamides in which the repeat units containing the different R groups of the diamines alternate regularly or appear in blocks in the polymer chains. For example, if the molar quantities of the diamines are not equal, some blockiness will always occur.

Specific polyoxamides which may be employed in the present invention include poly(ethylene oxamide) (nylon-22-), poly(trimethylene oxamide) (nylon-32), poly(tetramethylene oxamide) (nylon-42), poly(pentamethylene oxamide) (nylon-52), poly(hexamethylene oxamide) (nylon-62), poly(heptamethylene oxamide) (nylon-72), poly(octamethylene oxamide) (nylon-82), poly(nonamethylene oxamide) (nylon-92), poly(decamethylene oxamide) (nylon-102), poly(dodecamethylene oxamide) nylon-122), poly(hexamethylene/octamethylene oxamide) nylon-62/82), poly(hexamethylene/decamethylene oxamide) nylon-62/102), poly(hexamethylene/trimethylhexamethylene oxamide) (nylontrimethyl-62/62), poly(m-xylylene oxamide) (nylon-MXD2).

Copoly(amide-oxamides) of the present invention may be prepared according to methods known in the art, and such methods are described, for example, in the Morgan, Chang et al. and Stevenson et al. references mentioned above. Briefly, the copoly(amide-oxamides) may be prepared using melt, interfacial, and/or solution techniques which typically involve the reaction of a diamine or mixture of diamines with oxalic acid (or a derivative of oxalic acid) and one or more other dicarboxylic acids or their derivatives; or the reaction of one or more monoaminomonocarboxylic acids or derivatives or lactams thereof, with one or more diamines and oxalic acid (or a derivative thereof), and optionally, one or more dicarboxylic acids (or derivatives thereof). The distribution of the amide and oxamide repeat units in the copoly(amide-oxamides) may be random, regular alternating, block, or the like, depending on their method of preparation.

Suitable representative examples of the dicarboxylic acids employed in the amide/oxamide copolymers include aliphatic diacids such as sebacic acid, octadecanedioic acid, suberic acid, azelaic acid, undecanedioic acid, glutaric acid, pimelic acid, adipic acid, and the like; and aromatic dicarboxylic acids such as isophthalic acid terephthalic acid, naphthalene dicarboxylic acid, and the like. These dicarboxylic acids may also be used in the form of esters, acyl halides or like derivatives reactive with diamines or adducts thereof.

Representative examples of suitable aliphatic diamines which may be used in the copoly(amide-oxamides) include, for example, ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 2-methylpentamethylenediamine, 2-methylhexamethylenediamine, 2,2-dimethyl-1,5-diaminopentane, 2,2,4-trimethyl-1,6-diaminohexane, 2,4,4-trimethyl-1,6-diaminohexane, m-xylylenediamine, and the like. Suitable representative examples of aromatic diamines include p-phenylenediamine, 4,4'-diaminodiphenylsulfone, 4,4'-dia-minodiphenylether, 4,4'-diaminosdiphenylmethane, and the like. An example or an alicyclic diamine would be diaminodicyclohexylmethane. In addition, N,N'-bis(aminohydrocarbyl)diamides of the formula:

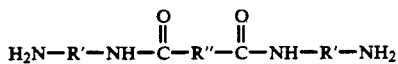

and N,N'-bis(aminohydrocarbyl)oxamides of the formula:

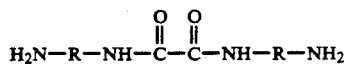

may also be used; they are prepared by the reaction of a dicarboxylic acid or its derivatives and oxalic acid or its derivatives, respectively, with at least a two-molar equivalent of one or more of the above diamines. Such diamines may be used alone, or two or more thereof may be used as in a mixture, to obtain random copoly(amideoxamides), or in sequential polymerization reactions to obtain alternating and/or block copoly(amide-oxamides).

Specific representative examples of monoaminomonocarboxylic acids and lactams include ε-aminocaproic acid, butyrolactam, pivalolactam, caprolactam, capryllactam, enantholactam, undecanolactam, dodecanolactam, and 3- and 4-aminobenzoic acids.

Specific copoly(amide-oxamides) which may be employed in the present invention include poly(hexamethylene oxamide/azelamide) (nylon-62/69), poly(hexamethylene oxamide/sebacamide) (nylon-62/610), poly(hexamethylene oxamide/isophthalamide) (nylon-62/6I), poly(hexamethylene oxamide/terephthalamide) (nylon-62/6T), poly(m-xylylene oxamide/m-xylylene adipamide) (nylon-MXD2/MXD6) and the like.

The polyoxamides and copoly(amide-oxamides) are employed as a barrier layer or layers using conventional packaging techniques and procedures. The barrier layer or layers may be coextruded with, adhesively laminated to or coated with or on another polymer or substrate layer, such as, polypropylenes, polyethylenes, including high density, low density and linear low density polyethylenes, ethylene-vinyl alcohol copolymers, ethylene-acrylic acid copolymers, ionomers of ethyleneacrylic acid copolymers, polyvinylidene chlorides, polyvinyl chlorides, poly(ethylene terephthalate), poly(ethylene 2,6-naphthalene dicarboxylate), polystyrene, polycarbonates, polyphenyleneoxide, and the like. The polyoxamides and copoly(amide-oxamides) may also be used as a monolayer packaging film, typically at a thickness of from about 0.5 to about 20 mils. The polyoxamides are formed into a package using conventional nylon processing methods such as, for example, extrusion, film manufacture, coextrusion, extrusion coating, blow molding, thermoforming, heat sealing, adhesive lamination, vacuum metallizing, and various other packaging applications known in the art.

The polyoxamide, including the amide/oxamide copolymers, are used in these structures as a barrier against oxygen, and carbon dioxide, generally as a flexible or rigid air-tight package, or as a part of an air-tight package. The thickness of the polyoxamide layer is determined by the oxygen barrier requirements and mechanical properties of the desired film or other structure. A thickness of from about 0.5 to about 20 mils is sufficient for typical packaging applications.

The polyoxamide and/or copoly(amide-oxamide)-containing barrier layers of the present invention will find utility in the packaging of a wide assortment of foodstuffs, liquids, medical products, and chemicals. The barriers can protect air-sensitive and oxidation-sensitive materials such as, for example, dairy products, seafood, oils, veqetables, meats, cheeses, salad dressings, blood and blood products, air sensitive chemicals and the like. The barriers of the present invention may also be used to package beverages including carbonated beverages and fruit juices since the barriers also have low permeability for carbon dioxide and organoleptics. The present barriers may also be used in retorted food applications wherein a packaged foodstuff is heated in the packaging material, by microwaves or boiling water, for example.

The invention is illustrated by, but not limited to, the examples which follow.

EXAMPLE 1

(Nylon-102)

Nylon-102 was prepared by melt polymerization from 1,10-diaminodecane and di-n-butyloxalate. A 250 ml, 3-necked, round bottom flask was fitted with a nitrogen inlet, a mechanical stirrer, and a distillation head. To this flask was added a solution of 17.23 g (0.1 mole) 1,10-diaminodecane in 30 ml dry toluene under nitrogen. An additional 5 ml toluene was used to rinse in the residual diamine solution. Di-n-butyl oxalate (20.22 g, 0.1 mole) was dissolved in 15 ml toluene and added to the diamine solution in one portion followed quickly by a 5 ml rinse with toluene. The flask was initially fitted with a drying tube. A white precipitate began to form within 1 minute and a moderate exotherm was observed. The drying tube was replaced with a nitrogen outlet to allow for escaping vapors (toluene and n-butanol). After three hours, the reaction vessel was fitted with a distillation head and heated to 270° C. using a Wood's metal bath. After 30 minutes at 270° C., the reaction mixture was homogeneous. The clear viscous melt was heated for an additional hour and then allowed to cool under nitrogen. A tough white plug was obtained upon breaking the flask. The yield was 21.30 g (94%) and the polymer melted at 253° C. The inherent viscosity was 0.88 dl/g. Polymer films (2.78-4.07 mils) were compression molded between sheets of a PTFE (Teflon)-coated aluminum using a Carver laboratory press. The unoriented sample was masked using adhesive-coated aluminum foil so that the test area was 5 cm$^2$. The oxygen transmission rate was measured on a Modern Controls Oxtran 1000 H oxygen permeability tester at 30° C. The oxygen permeability of the nylon-102 film at 30° C. was $14 \times 10^{-12}$ cc-cm/cm$^2$-sec-cm Hg at 0% relative humidity and $13 \times 10^{-12}$ cc-cm/cm$^2$-sec-cm Hg at 80% relative humidity.

EXAMPLE 2

(Nylon-92)

Nylon-92 was prepared from 15.83 g (0.1 mole) 1,9-diaminononane and 20.22 g (0.1 mole) di-n-butyloxalate, as described in Example 1. The molten polymer was heated for 1.5 hours at 270° C. and then allowed to cool under nitrogen. The flask cracked upon cooling. A white plug was obtained upon breaking the flask and weighed 18.37 g (87% yield). The inherent viscosity was 0.99 dl/g. The polymer melted at 248° C. The oxygen permeability of compression molded films was $13 \times 10^{-12}$ cc-cm/cm$^2$-sec-cm Hg at 30° C. and 0% relative humidity and $11 \times 10^{-12}$ cc-cm/cm$^2$-sec-cm Hg at 80% and 90% relative humidities.

EXAMPLE 3

(Nylon-82)

Nylon-82 was prepared from 14.43 g (0.1 mole) 1,8-diaminooctane and 20.22 g (0.1 mole) di-n-butyloxalate, as described in Example 1. The temperature of the Wood's metal bath was raised to 285° C. in order to obtain a homogeneous melt. Heating at 280°-290° C. was continued for 1.5 hours. The flask cracked upon cooling. A small chunk weighing 6.35 g (32% of theoretical yield) was ground up and used for compression molding film samples. The polymer melted at 279° C. The inherent viscosity was 1.00 dl/g. The oxygen permeability of compression molded films (3.83-5.55 mils) of nylon-82 at 30° C. was $7.0 \times 10^{-12}$ cc-cm/cm$^2$-sec-cm Hg at 0% relative humidity and $5.6 \times 10^{-12}$ cc-cm/cm$^2$sec-cm Hg at 80% and 90% relative humidities.

EXAMPLE 4

(Nylon-62/69)

Nylon-62/69 was prepared by the reaction of N,N'-bis(6-aminohexyl)oxamide with azelaoyl chloride as described in Chang et al., supra. Briefly, interfacial polymerization was used to synthesize the copoly(amide-oxamide). N,N'-bis(6-aminohexyl)oxamide (0.86 g, 0.003 mole) and sodium carbonate (0.64 g, 0.006 mole) were dissolved in 300 ml deionized water. To this solution was added 0.68 g (0.003 mole) azelaoyl chloride in 280 ml tetrachloroethylene. The reaction was repeated three times to yield 3.70 g (93%) of a white polymer which melted at 253° C. The inherent viscosity was 1.13 dl/g. The oxygen permeability at 30° C. of compression molded films (6.45-7.39 mils) was $4.5 \times 10^{-12}$ cc-cm/cm$^2$-sec-cm Hg at 0% relative humidity and $4.2 \times 10^{-12}$ cc-cm/cm$^2$-sec-cm Hg at 90% relative humidity.

EXAMPLE 5

(Nylon-62/610)

Nylon-62/610 was prepared form N,N'-bis(6-aminohexyl)oxamide and sebacoyl chloride similarly to the procedure described in Example 4, except 0.86 g (0.003 mole) N,N'-bis(6-aminohexyl)oxamide and 0.68 (0.006 mole) sodium carbonate were dissolved in 400 ml deionized water. The solution was filtered to remove a slight amount of insolubles and then placed in a blender. To this solution was added 0.72 g (0.003 mole) sebacoyl chloride in 300 ml tetrachloroethylene. The reaction was repeated once to give 2.50 g (92% yield) of a white polymer which melted at 259° C. The inherent viscosity was 1.05 dl/g. The compression molded films (4.47-4.83 mils) had an oxygen permeability at 30° C. of $5.3 \times 10^{-12}$ cc-cm/cm$^2$-sec-cm Hg at 0% relative humidity and $4.4 \times 10^{-12}$ cc-cm/cm$^2$-sec-cm Hg at 90% relative humidity.

EXAMPLE 6

(Nylon-62/6I)

Nylon-62/6I was prepared from N,N'-bis(6-aminohexyl)oxamide and isophthaloyl chloride similarly to the procedure described in Example 4, except 2.86 g (0.01 mole) N,N'-bis(6-aminohexyl)oxamide and 2.12 g (0.02 mole) sodium carbonate were dissolved in 320 ml deionized water. To this solution was added 2.03 g (0.01 mole) isophthaloyl chloride in 210 ml chloroform. The yield was 2.5 g (60%). The polymer melted at 240° C. The inherent viscosity was 1.23 dl/g. Compression molded films (5.75-7.73 mils) had an oxygen permeability at 30° C. of $4.3 \times 10^{-12}$ cc-cm/cm$^2$-sec-cm Hg at 0% relative humidity, $2.0 \times 10^{-12}$ cc-cm/cm$^2$-sec-cm Hg at 80% relative humidity, and $1.7 \times 10^{-12}$ cc-cm/cm$^2$-sec-cm Hg at 90% relative humidity.

COMPARATIVE EXAMPLE 1

(Nylon-66)

A commerical nylon-66 was obtained from Polyscience, Inc. for the purpose of comparison, and oxygen permeability data is included in Table I below. The inherent viscosity was 1.14 dl/g.

COMPARATIVE EXAMPLE 2

(Nylon-210)

An aqueous solution containing 2.13 g (0.052 mole) ethylene diamine, 4.0 g (0.10 mole) sodium hydroxide, and 257 ml deionized water was cooled to 0° C. and placed in a commercial Waring blender. The blender was stirred rapidly (90% on Variac) and a solution of 12.47 g (0.052 mole) sebacoyl chloride in 179 ml dichloromethane was added over a period of 5-10 seconds. Stirring was increased to full speed and continued for 3 minutes. The polymer precipitated rapidly in the form of a large white mass which had to be agitated to allow for efficient stirring. The polymer was collected on a fritted-glass funnel, rinsed with emthanol, water and acetone, and then dried in a vacuum oven at 110° C. for about 18 hours. The yield was 9.89 g (84%) and the polymer melted at 278° C. The inherent viscosity was 0.68 dl/g.

COMPARATIVE EXAMPLE 3

(Nylon-39)

The procedure of Comparative Example 2 was followed except 3.34 g (0.045 mole) 1,3-diaminopropane and 3.6 g (0.09 mole) sodium hydroxide were dissolved in 400 ml deionized water. To this solution was added 10.13 g (0.045 mole) axelaoyl chloride in 286 ml tetrachloroethylene. The resulting polymer was rinsed with water and acetone and dried in a vacuum oven at 110° C. for 6 hours. The yield was 6.36 g (62%) and the polymer melted at 217° C. The inherent viscosity was 0.85 dl/g.

COMPARATIVE EXAMPLE 4

(Nylon-48)

The procedure of Comparative Example 2 was followed except 3.31 g (0.0375 mole) 1,4-diaminobutane and 3.0 g (0.07 mole) sodium hydroxide were dissolved in 304 ml deionized water. To this solution was added 7.92 g (0.0375 mole) suberoyl chloride in 152 ml dichloromethane. The yield was 6.42 g (74%) and the polymer melted at 260° C. The inherent viscosity was 1.04 dl/g.

COMPARATIVE EXAMPLE 5

(Nylon-57)

The procedure of Comparative Example 2 was followed except 2.04 g (0.02 mole) 1,5-diaminopentane and 1.6 g (0.04 mole) sodium hydroxide were dissolved in 300 ml deionized water. To this solution was added 3.94 g (0.02 mole) pimeloyl chloride in 210 ml tetrachloroethylene. After the polymerization was complete, the reaction mixture was placed in a separatory funnel. The tetrachloroethylene layer was separated to facilitate filtration. The reaction was repeated to obtain more material and the two products combined. After rinsing with ethanol and acetone and drying in a vacuum oven, the polymer weighed 4.6 g (51%). The melting point of the polymer was 214° C. The inherent viscosity was 0.93 dl/g.

The oxygen permeabilities and physical properties of the polyoxamides and copoly(amide-oxamides) of Examples 1-6 and the polyamides of Comparative Examples 1-5 are summarized in the following Table I.

TABLE 1

OXYGEN PERMEABILITIES AND PHYSICAL PROPERTIES OF POLYOXAMIDES, COPOLY(AMIDE-OXAMIDES), AND POLYAMIDES

| EXAMPLE | POLYMER | OXYGEN PERMEABILITY ($10^{-12}$ cc-cm/cm²-sec-cm Hg) | | | $T_g$ (°C.)$^a$ | | $T_m$ (°C.) |
|---|---|---|---|---|---|---|---|
| | | 0% RH | 80% RH | 90% RH | DRY | WET | |
| 1 | Nylon-102 | 14 | 13 | NA | 60 | 42 | 253 |
| 2 | Nylon-92 | 13 | 11 | 11 | 57 | 48 | 248 |
| 3 | Nylon-82 | 7.0 | 5.6 | 5.6 | 62 | 46 | 279 |
| 4 | Nylon-62/610 | 5.3 | NA | 4.4 | 38 | 27 | 259 |
| 5 | Nylon-62/69 | 4.5 | NA | 4.2 | 57 | 42 | 253 |
| 6 | Nylon-62/61 | 4.3 | 2.0 | 1.7 | 100 | 49 | 240 |
| Comp. 1 | Nylon-66 | 2.4 | 4.9 | NA | 62 | 37 | 260 |
| Comp. 2 | Nylon-210 | 2.5 | 4.2 | NA | 52 | 37 | 278 |
| Comp. 3 | Nylon-39 | 1.7 | 3.9 | NA | 46 | 42 | 217 |
| Comp. 4 | Nylon-48 | 1.7 | 3.4 | NA | 48 | 37 | 260 |
| Comp. 5 | Nylon-57 | 2.1 | 4.2 | NA | 54 | 33 | 214 |

NOTE FOR TABLE I:
$^a$By TMA; dry films were conditioned at 0% RH (over $P_2O_5$, $CaSO_4$, vacuum); wet films were conditioned at 23° C. and 81% RH until equilibrated.

EXAMPLE 7

(Nylon-MXD2/MXD6)

Nylon MXD2/MXD6 was prepared by melt polymerization from m-xylyene diamine and a mixture of apidic acid and di-n-butyl oxalate. A 100 ml 3-necked, round bottom flask was fitted with a nitrogen inlet, a mechanical stirrer, and a distillation head. To this flask was added 20.457 g (0.150 mole) m-xylylene diamine and 15.357 g (0.105 mole) apidic acid. The mixture was melted and heated under a positive flow of nitrogen at 195° C. using a Wood's metal bath for 1 hour and 15 minutes while distilling off formed water. The melt was allowed to cool to room temperature and 9.124 g (0.045 mole) di-n-butyl oxalate in 15 ml xylylene was added to the flask. The temperature was then raised to 235°-240° C. and maintained for 1 hour and 30 minutes while distilling off xylene and n-butanol. A vacuum of 3 mm Hg was applied over a 10 minute period. After 30 minutes, the vacuum was increased to 0.2-0.3 mm Hg for 30 minutes. This viscous, yellow melt solidified upon cooling. The solid was a prepolymer having an inherent viscosity of 0.27 dl/g. The solid was ground using a laboratory mill, purified by dissolving in m-cresol followed by precipitation into methanol, and then dried in a vacuum over for about 12 hours. A 10 g portion of the powdered prepolymer was placed in a 100 ml round bottom flask and the polymerization was continued according to the following scheme: 0.2-0.3 mm Hg/180° C./24 hr and then 0.3-0.3 mm Hg/225° C./4 hr. The resulting polymer weighed 9.60 g (96% conversion) and had an inherent viscosity of 0.61 dl/g. The polymer melted at 199° C. Tough flexible films were compression molded at 230°–240° C.

The foregoing description and examples of this invention are illustrative and explanatory thereof. Various modifications will occur to those skilled in the art in view of the foregoing disclosure. All such variations which fall within the scope or spirit of the appended claims are intended to be embraced thereby.

We claim:

1. An oxygen barrier film having a lower or substantially equivalent oxygen permeability at a high relative humidity compared with that at a low relative humidity, comprising a polymer comprising repeating oxamide units of the formula:

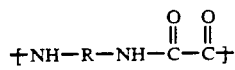

wherein R is a hydrocarbyl of from 2 to about 20 carbon atoms wherein the oxygen permeability at 0% relative humidity is between $1 \times 10^{-11}$ to $1 \times 10^{-13}$ cc-cm/cm$^2$-sec-cm Hg.

2. The film of claim 1, wherein said polymer is a homopolymer of oxamide.

3. The film of claim 1, wherein R is alkylene of from 6 to 12 carbon atoms.

4. The film of claim 1, wherein R is alkylene of from 7 to 10 carbon atoms.

5. The film of claim 1, wherein R is arylene of from 6 to 14 carbon atoms.

6. The film of claim 1, wherein said layer comprises nylon-82.

7. The film of claim 1, wherein said layer comprises nylon-92.

8. The film of claim 1, wherein said layer comprises nylon-102.

9. The film of claim 1, wherein said polymer has an inherent viscosity of from 0.4 to about 1.6 dl/g, the viscosity being determined at 30° C. using concentrated sulfuric acid containing 0.5 g of polymer per deciliter of solution.

10. The film of claim 1, wherein said polymer has an inherent viscosity of from about 0.6 to about 1.3 dl/g, the viscosity being determined at 30° C. using concentrated sulfuric acid containing 0.5 g of polymer per deciliter of solution.

11. The barrier of claim 1, wherein said layer is part of a flexible packaging material.

12. The barrier of claim 1, wherein said layer is part of a rigid packaging material.

13. The barrier of claim 1, wherein said polymer has a lower oxygen permeability at a higher relative humidity than it does at 0% relative humidity.

14. A package having contents protected from oxidation by the barrier of claim 1.

15. The barrier of claim 1, wherein said layer is a monolayer film.

16. A multilayer oxygen barrier film having at least one layer comprising a polymer containing repeating oxamide units of the formula:

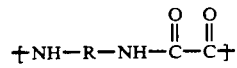

wherein R is a hydrocarbyl of from 2 to about 20 carbon atoms and the polymer has a lower or substantially equivalent oxygen permeability at a high relative humidity compared with that at a low relative humidity, wherein the oxygen permeability at 0% relative humidity is between $1 \times 10^{-11}$ to $1 \times 10^{-13}$ cc-cm/cm$^2$-sec-cm Hg.

* * * * *